June 24, 1930.   R. W. ROHRKE   1,766,690
GUARD
Filed June 14, 1929
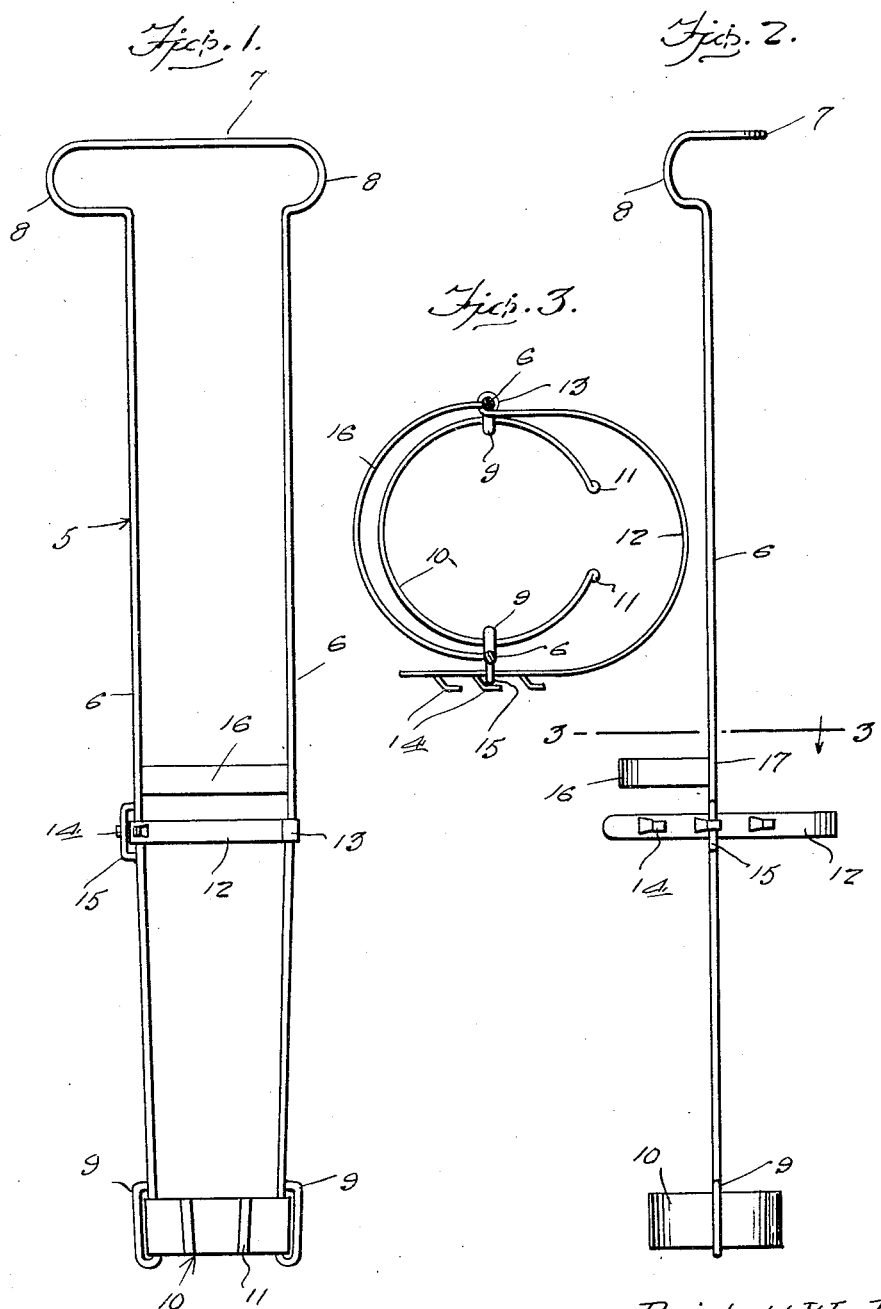
Inventor
Reinhold W. Rohrke
By Clarence A. O'Brien
Attorney Patented June 24, 1930

1,766,690

UNITED STATES PATENT OFFICE

REINHOLD W. ROHRKE, OF NORFOLK, NEBRASKA

GUARD

Application filed June 14, 1929. Serial No. 370,849.

This invention relates to a device for use when milking cows and has as its primary object the provision of a suitable guard which may be attached to the body of the person milking the cow to protect the milker against 'switching or the striking of the milker by the cow with her tail.

The primary object of the invention is to provide a suitable guard device which may be attached to the person of the milker in such a manner as to protect the face of the milker, without in any way impeding the milking of the cow.

Another object of this invention is to provide a device of the character above mentioned which is simple in construction, can be manufactured and sold at a relatively small cost, consists of but few parts, can be readily and easily attached to the milker, and is practical, useful and otherwise well adapted to the purpose designed.

Other objects and advantages of the invention will become apparent during a study of the following description, taken in connection with the accompanying drawings, wherein:

Figure 1 is a front elevation of a guard constructed in accordance with this invention.

Figure 2 is a side elevation thereof.

Figure 3 is a detail sectional view, taken substantially on the line 3—3 of Figure 2 and looking in the direction of the arrow.

With reference more in detail to the drawings, it will be seen that my improved guard comprises a frame 5, said frame being preferably formed of resilient metal so bent as to provide a pair of spaced parallel leg members 6 of suitable length, said leg members being joined by a suitable loop portion 7. The loop portion is preferably formed by bending the material of the leg adjacent one end of the leg, in such a manner as to provide laterally projecting substantially arcuate shaped portion 8 and then bending the material back upon itself as to provide the substantially horizontally disposed loop portion 7. It is to be noted that the loop 7 extends somewhat laterally of the legs 6—6 as clearly shown to advantage in Figure 1.

At the free ends the respective legs 6—6 are bent upon themselves as to provide loops 9. Supported by said legs and extending through the loops 9 is a spring clamp or strap 10. As illustrated the clamp or strap 10 is preferably in the nature of a split ring, the ends of which are bent upon themselves as at 11 so as to prevent injury to the wearer. The strap or clip 10 is adapted to encircle the ankle of the wearer so that the frame may extend upwardly along the front of the leg. Adjacent the last mentioned end of the legs 6—6, a suitable strap 12, also preferably formed of metal, has one end thereof secured to one of the legs as at 13, so as to extend about the leg at the rear thereof below the knee, the opposite end of the strap being provided with a plurality of spring hooks or clips 14, disposed in spaced relation on said strap. This end of the strap is adapted to be passed through a suitable eye or loop 15, suitably formed on the other leg 6, and with which either one of the spring clips 14 may engage so as to hold the strap about the leg. Thus it will be seen that the strap 12 may be adjusted so as to meet the requirements of varying sized legs. An auxiliary strap 16 also preferably formed of metal, such as spring steel or the like, is preferably arcuate or semi-circular in formation. The said strap 16 at its ends is welded or otherwise fixed to the respective legs 6—6 as at 17, just above the strap 12 and curved outwardly between the legs in an opposite direction to said strap 12, said strap 16 adapted to extend across the front of the leg and of course below the knee of the wearer. Thus it will be seen that when the guard or frame 5 is secured to the left leg of the wearer in this manner, the legs 6—6 being of suitable length will permit the upper end of the frame, that is, the loop portion to extend above the knee in line or above the face of the wearer when the wearer may be sitting upon a stool or in a similar posture necessary when milking the cow. Thus it will be readily appreciated that when the cow switches her tail, the tail will be prevented from coming into contact with the face of the wearer, as it is apparent that the switching tail will strike against the upper end of the frame, without harming the milker in any way.

With a guard of this nature, the milker may, even with the guard fixed to his leg as in the manner above set forth, walk from cow to cow without being hampered in any annoying degree by the frame.

From the foregoing, then, it will be seen that I have provided a very simple and inexpensive guard to protect the face of the milker from the switching tail of the cow, which can be readily and easily attached to the person of the milker, will not interfere with his walking from one to another of the cows and in no way hamper him in his milking operation. Even though I have herein shown and described the preferred embodiment of my invention, it is to be understood that the same is susceptible to changes fully comprehended by the spirit of the invention or the scope of the appended claims.

What I wish to claim is:

1. In a guard of the class described, an elongated frame member adapted to extend in parallelism with the leg of the wearer, a split clamping ring carried by said frame at one end thereof, said ring adapted to engage the ankle of the wearer, said frame being further provided intermediate its ends with a strap adapted to engage and extend at points about the leg below the knee and said frame at its opposite end extending above the knee to provide a tail guard, and said frame at said upper end provided with laterally extending portions.

2. In a device of the class described, a frame member comprising a pair of spaced parallel leg portions adapted to be secured to the leg of the wearer, said leg portions extending in parallelism to the leg, the material of the frame at one end of the respective legs being bent laterally of the legs and being bent to provide a loop connection between the said leg members, said loop portion adapted to extend above the knee adjacent the face of the wearer when said frame is in an applied position and the wearer is in a sitting or similar position.

3. In a device of the class described, an elongated frame member adapted to be secured to the leg of the wearer and extend in spaced parallelism thereto, an ankle engaging member carried by said frame at one end thereof, leg straps carried by said frame intermediate its ends, said leg straps adapted to engage the leg of the wearer beneath the knee of the leg, and said frame being formed at its opposite end to provide a horizontally disposed loop portion adapted to extend above the knee of the wearer when the guard is in an applied position.

4. In a tail guard of the class described, an elongated substantially U-shaped member comprising a pair of co-extensive legs and a loop connecting the legs at one end, said legs at their opposite ends being each provided with a loop, an ankle engaging band passing through the last referred to loops, an adjustable strap connecting the legs intermediate the ends thereof, said strap adapted to be passed about the legs of the wearer for retaining said inverted U-shaped member on the legs, and said legs of the member above said strap extending above the knee of the wearer for protecting the face of the wearer.

In testimony whereof I affix my signature.

REINHOLD W. ROHRKE.